Jan. 24, 1961 L. SCHAFER 2,969,025
PASTRY FOLDER
Filed May 9, 1960
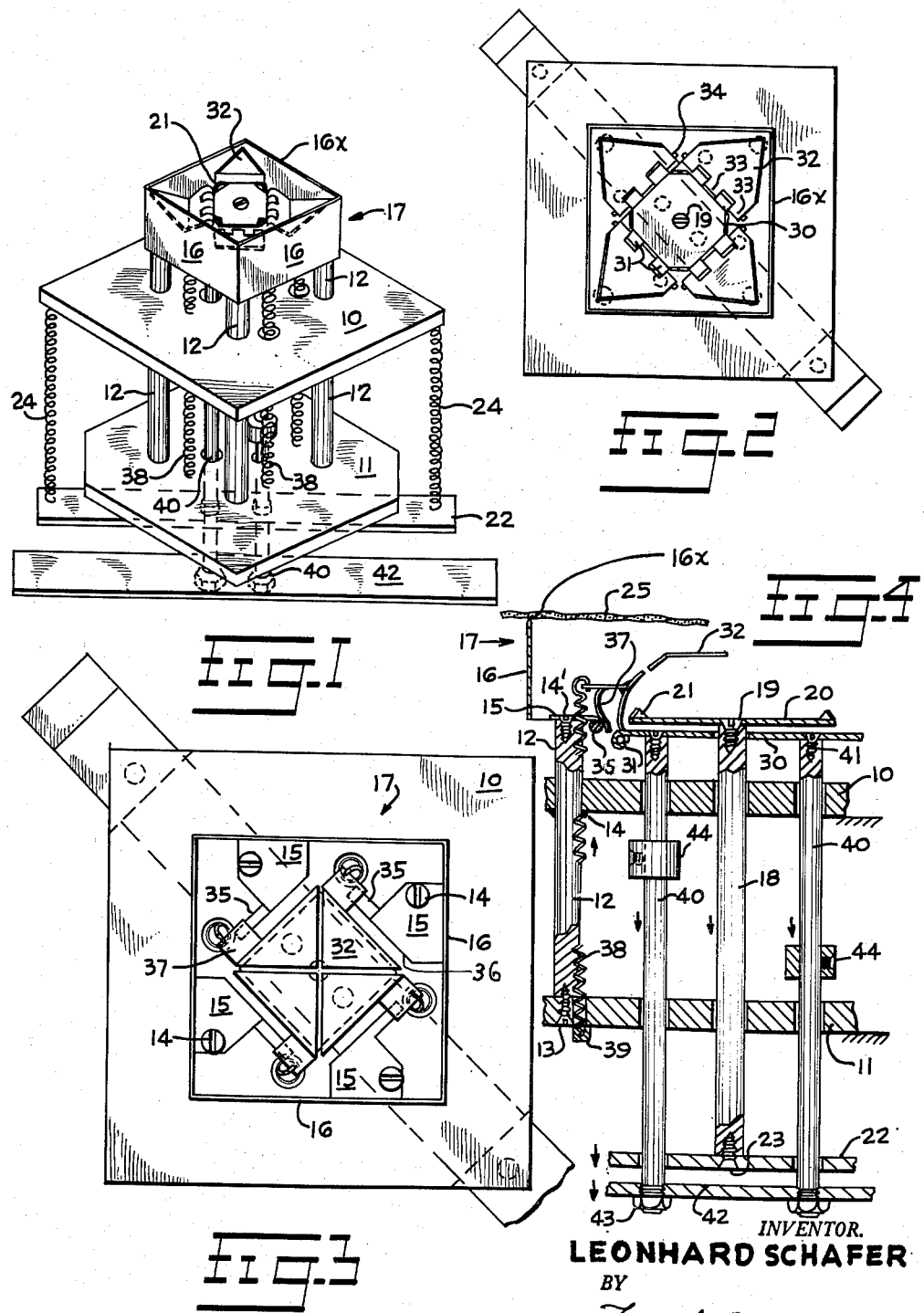
INVENTOR.
LEONHARD SCHAFER
BY
*Frank Makara*
ATTORNEY

United States Patent Office

2,969,025
PASTRY FOLDER
Leonhard Schafer, 219 Mirian St., New York, N.Y.

Filed May 9, 1960, Ser. No. 27,897

5 Claims. (Cl. 107—8)

The invention relates to a device for folding dough in the making of pastry.

It is an object to provide a dough folding machine.

It is another object to provide a dough folding machine for making miniature pastry pieces.

These and other objects of this invention will become apparent upon reading the following descriptive disclosure taken in connection with the accompanying drawing in which:

Fig. 1 is a perspective view of the machine,

Fig. 2 is a top plan view of the machine showing the folding arms in open position, Fig. 3 is a top plan view showing the folding arms in closed position, and Fig. 4 is a section view broken away in part and showing the mechanical means for actuating the machine.

The machine shown in Fig. 1 is but a single cell or unit of a multi-cell device. For purpose of simplicity the operation of this single cell will be described. However it is to be clearly understood that in the commercial device the multiple units function simultaneously, so that a vast plurality of folded miniature pastry units are rapidly produced.

Moreover, whereas the device of Fig. 1 shows the production of a four fold pastry, it is obvious that by the elimination of a pair of opposed folder elements, that a two fold pastry will be produced.

The device or machine of this invention is particularly useful in the manufacture of edible Danish pastry containing spoonable filling material.

Turning to the drawing, a pair of stationary horizontally disposed and spaced-apart support plates 10 and 11 are separated by a plurality of pillars 12 secured thereto as by screws 13 and, for example, welding 14 (Fig. 4).

Each pillar 12 extends suitably beyond the top support plate 10 and are secured by means of screws 14' to respective horizontally disposed lugs 15 integral with a respective vertically disposed wall 16 of a rectangular cage 17.

The topmost edge of each wall 15 is provided with a sharp knife-like edge 16X to effect cutting into a blanket of dough placed thereon.

A moveable cylindrical rod 18 (Fig. 4) is secured by a screw 19 to a rectangular horizontal platform 20 having upright ears 21 at its respective corners. The rod 18 is vertically and reciprocally moveable relative to the stationary plates 10 and 11. The bottom of rod 18 is secured to a first moveable plate 22 by means of a screw 23. A pair of coil springs 24 continuously urge the plate 22 toward plate 11 so that platform 20 is normally disposed in substantially a planar relationship to the four knife-like edges of the cage 17 (Fig. 1). In this manner rod 18, or a plurality of rods 18 are independently moved downwardly along with platforms 20 into the cages 17 by downward actuation of plate 22. Upon release of the downward force on plate 22, the coil springs 24 return the rod 18 and the platform 20 secured thereto back to its normal position (Fig. 1). Accordingly it is seen that a sheet of dough 25 may be cut to the shape of cage 17 as by use of a rolling pin applied to said dough and that a spoonable filling as, for example, a fruit jam when disposed on the dough over the platform 20 will be conveyed into said cage 17 whenever said platform descends into said cage.

The means to effect a folding over of the dough sheet material exteriorly disposed relative to the rectangular platform 20 in cage 17 is an important feature of this invention. To produce an over-all timed sequence result where first one pair of opposed folder arms are actuated in timed sequence followed a second pair of opposed folder arms, a plurality of cam surfaces are employed. To obtain this end, a second independently moveable platform 30 is provided. Platform 30 is a rectangular platform having slightly larger dimensions than those of platform 20 and is disposed directly beneath said platform 20 (Fig. 4). The four edges of platform 30 are each provided with a pair of integral hinge pin receiving studs 31. A folder arm 32 having a suitable angular channel therein and having suitable hinge pin receiving studs 33 is secured by a hinge pin 34 to a respective edge of the platform 30.

The stud 15 of cage 17 is provided with a cam surface. Preferably a round cam pin 35 is secured into turned crimp clamps 36 integral with said stud 15.

Preferably the cage 17 and its integral studs 15 and the clamps 36 thereon is made from stainless steel sheet metal. To bring about the desired timed sequential turning of the respective folder arms 32, suitably curved cam plates 37 are welded to the bottom surface of each folder arm 32. The cam plates 37 are each provided with an aperture and a coil spring 38 is secured to the edge of said aperture and to the fixed plate 11.

As shown in Fig. 1, the springs 38 pass through suitable spring receiving holes disposed in top plate 10 and are secured to plate 11 by plugs 39 to continually urge the apex of the folder arms into the respective corner of the cage 17.

In order to pull down platform 30 after platform 20 has descended suitably a pair of columns 40 are secured to platform 30 by conventional screws 41. The columns 40 pass through apertures provided in stationary plates 10 and 11 and are threaded into a second moveable plate 42 and secured thereto by threaded nuts 43. The vertical movement of platform 30 is preferably limited by means of stop lugs 44 secured to the columns 40 in order to prevent for example, undue clashing of the apex of the holder arms against the cage 17.

As shown in Fig. 4, the columns 40 pass moveably through plates 10 and 11 through suitable apertures provided for said columns.

In operating the device of Fig. 4, the first moveable plate 22 is pulled downwardly along with rod 18 and platform 20 having the cut dough and edible fruit filling thereon. Downward motion of platform 20 continues until platform 20 engages platform 30. Continued forced downward movement of plates 22 and 42, causes fixed pins 35 to engage the exterior surface of the respective downwardly moving cams 37 causing the cams 37 to turn over the folder arms 32 and the sheet of dough material thereon.

Thus the dough located exteriorly of platform 20 is turned over upon the filling. Clearly where cam surfaces 37 are slightly altered in slope, the sequence of folding of the four arms 32 is effected. Thus one pair of opposed arms 32 may be operated first, one after the other, followed by the second pair of opposed arms 32.

Various modifications of this invention are possible within the ambit of this conception. Thus the cam surface 37 may engage the stud 15 directly and in the absence of a pin 35. Also the cam surfaces 37 may be so modified that all four apices of the respective arms 32 meet to form a pyramid thereby yielding a like-shaped Danish pastry. In such event the channeling of arms 32 is undesirable. Channeled arms 32 are however preferred where dough is folded over in overlapping relationship.

Upon release of the downward force on plates 22 and 42, the springs 24 and 38 return the platforms and the folded arms to their normal position shown in Fig. 1 and the folded Danish pastry is then easily picked up by hand from the four ears 21 and placed upon a tray ready for the baking oven.

As stated before the commercial machine may consist for example, of the 48 or 72 of the unit cells described above. Clearly having described my invention other modifications will become obvious to those skilled in the art but all these modifications are deemed to fall within the scope of this invention and the claims herein.

I claim:

1. A pastry dough folding machine for making fruit filled Danish pastry comprising a cage having vertically disposed spaced-apart walls, a first platform disposed centrally in said cage, means for operating said first platform reciprocally in the vertical wall cage, a second platform disposed centrally in said cage in spaced relationship beneath said first platform, a plurality of folder arms secured hingedly to said second platform, stud means fixedly secured to each of said vertical walls and disposed horizontally into said cage, cam means fixedly disposed on the exterior surface of each of said folder arms for respectively slidingly engaging said fixed stud means to turn over said hingedly secured folder arms and any dough thereon onto said first platform, means for operating said second platform reciprocally in said cage after said first platform descendingly engages said second platform, and spring means for returning said first and said second platform to their normal spaced-apart relationship upon release of said first and said second operating means.

2. The machine of claim 1 wherein the cage is a rectangular cage, said first and said second platforms are rectangular platforms and wherein said folder arms are channeled inwardly toward the center of the cage whereby the dough turned over by said cam operated arms is disposed in overlapping relationship.

3. The machine of claim 2 wherein said stud means comprises a round pin and wherein individual cam means comprises respectively sloped elements whereby a preselected turning over of pre-selected folder arms is effected in timed sequence to obtain a pastry unit having a plurality of over-lapped folds engaging one another.

4. The device of claim 3 wherein the means for operating reciprocally said first platform comprises a reciprocating pillar secured to the center of said first platform and passing through an aperture disposed centrally in said second platform and secured to a first vertically actuated plate.

5. The apparatus of claim 4 wherein the means for operating said second platform comprises a plurality of reciprocating columns secured to a second vertically actuated plate, said first plate being adapted to descendingly engage said second plate whereby said folder arms with the dough thereon are turned over onto the descending first platform inside the vertical walls of said cage.

References Cited in the file of this patent
UNITED STATES PATENTS

| | | |
|---|---|---|
| 628,449 | Carr | July 11, 1899 |
| 2,055,726 | Moss | Sept. 29, 1936 |
| 2,574,548 | Deutsch | Nov. 13, 1951 |
| 2,734,465 | Head | Feb. 14, 1956 |